US006554889B2

(12) United States Patent
Odaka

(10) Patent No.: US 6,554,889 B2
(45) Date of Patent: Apr. 29, 2003

(54) INK COMPOSITION FOR FORMING DYE LAYER AND HEAT TRANSFER PRINTING SHEET USING THE SAME

(75) Inventor: Tsuaki Odaka, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 20 days.

(21) Appl. No.: 09/963,587

(22) Filed: Sep. 27, 2001

(65) Prior Publication Data

US 2002/0062761 A1 May 30, 2002

(30) Foreign Application Priority Data

Sep. 28, 2000 (JP) ....................................... 2000-295522

(51) Int. Cl.$^7$ ............................ C09D 11/00; B32B 3/00

(52) U.S. Cl. ................................ 106/31.29; 106/31.58; 428/195

(58) Field of Search ........................... 106/31.29, 31.58; 428/195

(56) References Cited

U.S. PATENT DOCUMENTS 4,968,659 A 11/1990 Nishitani .................... 503/227
2002/0032271 A1 * 3/2002 Katashima et al. ......... 524/495
2002/0039641 A1 * 4/2002 Hayashi et al. ............. 428/195
2002/0165093 A1 * 11/2002 Eto et al. .................... 503/227

FOREIGN PATENT DOCUMENTS

JP 10-067182 3/1988

OTHER PUBLICATIONS

Patent Abstracts of Japan, vol. 1998, No. 8, Jun. 30, 1998 & JP 10 067182 A, Mar. 10, 1998 Abstract.

* cited by examiner

*Primary Examiner*—Mark L. Bell
*Assistant Examiner*—Veronica F. Faison
(74) *Attorney, Agent, or Firm*—Parkhurst & Wendel, L.L.P.

(57) ABSTRACT

In an ink composition comprising a phosphoric ester and a dye, if the phosphoric ester is composed of an acid-type phosphoric ester and a neutralized-type phosphoric ester, the phosphoric ester and the dye hardly react with each other. Therefore, when such an ink composition is used to form a dye layer, a constituent layer of a heat transfer printing sheet, the discoloration or fading of the dye layer is minimized. Further, a heat transfer printing sheet comprising a dye layer formed by using this ink composition shows improved separability from an image-receiving sheet after an image is thermally transferred to the image-receiving sheet, regardless of the material for the substrate of the image-receiving sheet. It is thus possible to obtain an excellent image on an image-receiving sheet.

6 Claims, 2 Drawing Sheets

1

INK COMPOSITION FOR FORMING DYE LAYER AND HEAT TRANSFER PRINTING SHEET USING THE SAME

BACKGROUND OF THE INVENTION

1. Field of the Invention

The present invention relates to an ink composition for forming a dye layer, a constituent layer of a heat transfer printing sheet, and to a heat transfer printing sheet using the ink composition.

2. Background Art

Heretofore, heat transfer printing methods have widely been used as printing methods for forming, on image-receiving sheets, images with gradation, or monotone images such as characters and symbols. Of the heat transfer printing methods, printing methods of sublimation transfer type and of hot-melt transfer type are now used extensively.

The heat transfer printing method of sublimation transfer type is as follows: a heat transfer printing sheet comprising a substrate sheet carried on a dye layer which incorporates sublimation dye dispersed or dissolved in a binder resin is superposed on an image-receiving sheet, and energy is applied to the heat transfer printing sheet by a heating means such as a thermal head or laser to sublime the dye to transfer it to the image-receiving sheet, or to diffuse the dye to migrate it to the image-receiving sheet, thereby forming an image on the image-receiving sheet. On the other hand, the heat transfer printing method of hot-melt transfer type is as follows: a heat transfer printing sheet comprising a solid ink composition composed of a waxy binder and a coloring material such as a pigment is superposed on an image-receiving sheet, and energy is applied to the heat transfer printing sheet by a heating means such as a thermal head or laser to melt the solid ink composition; the melted ink composition is thus transferred to the image-receiving sheet and produces thereon an image.

In the heat transfer printing method of sublimation transfer type, it is possible to control the amount of a dye to be transferred or migrated to an image-receiving sheet to form thereon one dot by changing the amount of energy that is applied to a heat transfer printing sheet. This method can therefore successfully produce a full-color image that is excellent in gradation and that has high quality comparable to that of conventional silver-salt photographic images. Owing to this advantageous feature, the heat transfer printing method of sublimation transfer type is now attracting attention, and being employed in various fields as a means for recording information.

On the other hand, one important feature that is required for heat transfer printing sheets is separability from image-receiving sheets. In a heat transfer printing method, a heat transfer printing sheet is superposed on an image-receiving sheet, and heat is applied to the heat transfer printing sheet to thermally transfer an image to the image-receiving sheet. Therefore, to attain the smooth transfer of an image, it is essential that the heat transfer printing sheet and the image-receiving sheet be easily separated from each other after the heat transfer printing of an image is completed. Moreover, before and after the heat transfer printing process, the heat transfer printing sheet and the image-receiving sheet are usually carried in the superposed state. Therefore, to prevent the blocking of the two sheets, it is required that the two sheets be easily separable. In particular, in the case where information that is a combination of characters, graphics and images is thermally transferred from a heat transfer printing sheet to an image-receiving sheet having no ink-receiving layer, these two sheets tend to stick to each other while the heat transfer printing of the information is conducted, depending on the material for the substrate of the image-receiving sheet.

To improve the separability of heat transfer printing sheets from image-receiving sheets, there has been proposed a heat transfer printing sheet comprising a dye layer that contains a releasing agent such as silicone. In such a heat transfer printing sheet, however, the compatibility of the releasing agent such as silicone and a binder resin used for the dye layer is not good, so that the releasing agent tends to separate from the binder resin and migrates to the surface of the dye layer. For this reason, even this heat transfer printing sheet cannot be smoothly separated from an image-receiving sheet after an image is thermally transferred to the image-receiving sheet.

To further improve the separability of heat transfer printing sheets from image-receiving sheets, there has been proposed a heat transfer printing sheet comprising a dye layer that contains as a binder resin a graft copolymer having release properties, obtained by graft-copolymerizing a compound having release properties with a polymer. In addition, Japanese Laid-Open Patent Publication No. 67182/1998 describes a heat transfer printing sheet capable of showing improved separability from an image-receiving sheet regardless of the material for the substrate of the image-receiving sheet. In this heat transfer printing sheet, a phosphoric ester is incorporated as a releasing agent into a dye layer, a constituent layer of the heat transfer printing sheet. However, phosphoric esters can react with certain types of dyes when they are mixed, and, as a result, the dyes often undergo change in color. Thus, from the viewpoint of long-term storage stability, there is yet room for improvement even in this heat transfer printing sheet comprising a dye layer that contains a phosphoric ester and a dye.

SUMMARY OF THE INVENTION

We found that, in an ink composition comprising a phosphoric ester and a dye, if the phosphoric ester is composed of an acid-type phosphoric ester and a neutralized-type phosphoric ester, the phosphoric ester and the dye hardly react with each other, so that the long-term storage stability of the ink composition is excellent and the discoloration or fading of a dye layer, a constituent layer of a heat transfer printing sheet, formed by using the ink composition is minimized. We also found that a heat transfer printing sheet comprising a dye layer formed by the use of the above ink composition shows improved separability from an image-receiving sheet regardless of the material for the substrate of the image-receiving sheet and can produce an excellent image on the image-receiving sheet. The present invention was accomplished on the basis of these findings.

Namely, an object of the present invention is to provide an ink composition for forming a dye layer in which a dye shows excellent long-term storage stability and which can impart, to a heat transfer printing sheet, improved separability from an image-receiving sheet. Another object of the present invention is to provide a heat transfer printing sheet using this ink composition.

The first embodiment of the present invention is an ink composition for forming a dye layer, a constituent layer of a heat transfer printing sheet. This ink composition comprises a sublimation dye, a binder resin, a phosphoric ester and a solvent, wherein the phosphoric ester is composed of an acid-type phosphoric ester and a neutralized-type phosphoric ester.

The second embodiment of the present invention is a heat transfer printing sheet comprising a substrate sheet, and dye layers of one or more colors formed on one surface of the substrate sheet, wherein at least one of the dye layers is formed by the use of an ink composition according to the first embodiment of the present invention.

DETAILED DESCRIPTION OF THE INVENTION

Figure 1:
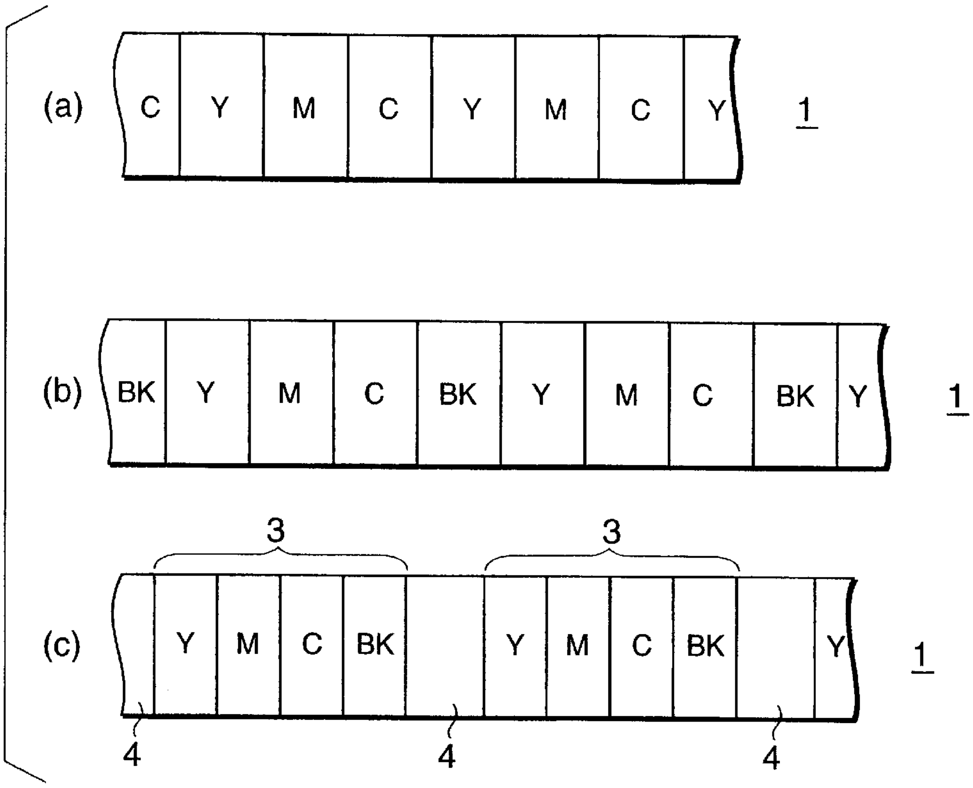
FIG. 1 is a plane view showing one embodiment of the heat transfer printing sheet according to the present invention.

1. Ink Composition for Forming Dye Layer a) Phosphoric Ester

An ink composition according to the present invention comprises a phosphoric ester. The phosphoric ester for use herein is composed of an acid-type phosphoric ester and a neutralized-type phosphoric ester, which can be obtained by the esterification of phosphoric acid.

The acid-type phosphoric ester for use in the present invention is a one having a pH no more than 5. Examples of such phosphoric esters include those ones represented by the following structural formula (I):

(I)

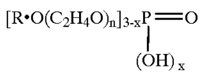

wherein R represents an alkyl group, or an alkylallyl group, and n represents the number of moles of ethylene oxide, and X represents 1 to 2, and those ones represented by the following structural formula (II):

(II)

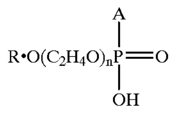

wherein R represents an alkyl group, an alkylallyl group, or an alkylphenol group, n represents the number of moles of ethylene oxide, and A is OH or $RO(C_2H_4O)n$ in which R represents alkyl group or alkylallyl group, and n represents the number of moles of ethylene oxide.

Acid-type phosphoric esters represented by the above structural formula (I) are commercially available, and "Plysurf A-208S" manufactured by Dai-ichi Kogyo Seiyaku Co., Ltd., Japan is one example of such phosphoric esters. Acid-type phosphoric esters represented by structural formula (II) are commercially available, and examples of such phosphoric esters include "Plysurf A-208F" manufactured by Dai-ichi Kogyo Seiyaku Co., Ltd., Japan, and "PHOSPHANOL" series manufactured by Toho Chemical Industry Co., Ltd., Japan. Commercially available acid-type phosphoric esters having structures other than the above two are, for instance, "Phoslex A" series manufactured by Sakai Kagaku Kogyo K.K., Japan, or manufactured by Osaki Industry Co., Ltd., Japan. These phosphoric esters have the following structural formulas:

$(C_nH_{2n+1}O)_2P(O)OH+C_nH_{2n+1}OP(O)(OH)_2$, $(C_nH_{2n-1}O)_2P(O)OH+C_nH_{2n-1}OP(O)(OH)_2$, $(C_{18}H_{35}\ O)_2P(O)OH+C_{18}H_{35}OP(O)(OH)_2$, and $(C_8H_{17}O)_2P(O)OH$.

The neutralized-type phosphoric ester for use in the present invention is a one having a pH between 7 and 9. Examples of such phosphoric esters include those ones represented by the following structural formula (III):

(III)

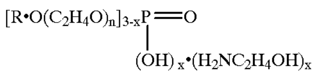

wherein R represents an alkyl group, or an alkylallyl group, n represents the number of moles of ethylene oxide, and x is a number of 1 to 2.

Neutralized-type phosphoric esters having structures other than the above-described one can also be used herein. Specific examples of such phosphoric esters include those ones in which acid-type phosphoric esters represented by the above structural formula (I) are intermingled with the group $(H_2NC_2H_4OH)$, where the acid-type phosphoric esters and the group may be chemically bonded or not bonded.

Commercially available neutralized-type phosphoric esters, for example, "Plysurf M-208F" and "Plysurf M-208BM" manufactured by Dai-ichi Kogyo Seiyaku Co., Ltd., Japan, can be used in the present invention.

The ratio of the acid-type phosphoric ester to the neutralized phosphoric acid is from 80:20 to 50:50, more preferably from 70:30 to 60:40. If the acid-type phosphoric ester and the neutralized-type phosphoric ester are used in the above ratio, the acid-type phosphoric ester and dyes (e.g., indoaniline dyes) hardly react with each other, so that the dyes scarcely undergo discoloration or fading; and the neutralized-type phosphoric ester and dyes (e.g., methine dyes) hardly react with each other, so that the dyes are prevented from undergoing change in color to a great extent.

According to the present invention, therefore, a color layer formed by using an ink composition comprising a phosphoric ester composed of an acid-type phosphoric ester and a neutralized-type phosphoric acid in a ratio in the above-described range, and a mixture of various types of dyes such as indoaniline dyes, methine dyes and anthraquinone dyes can effectively be prevented from discoloration or fading.

Preferably, the ink composition according to the present invention contains the phosphoric ester in an amount of 0.1 to 30% by weight of the total amount of the binder resin. A heat transfer printing sheet having a dye layer formed by applying, to a substrate sheet, the ink composition containing the phosphoric ester in an amount in the above-described range shows improved separability from an image-receiving sheet after an image is thermally transferred to the image-receiving sheet that is superposed on the heat transfer printing sheet. In addition, the adhesion between the substrate sheet and the dye layer is improved. Moreover, there can be effectively prevented the undesirable transfer of the dye contained in the dye layer to the back surface of the heat transfer printing sheet in the wound-up state. Thus, as long as the phosphoric ester content is in the above-described range, the ink composition of the present invention can make a heat transfer printing sheet easily separable from an image-receiving sheet after an image is thermally transferred to the image-receiving sheet, regardless of the material for the substrate of the image-receiving sheet.

b) Sublimation Dye

The ink composition of the present invention comprises as a coloring material a sublimation dye. Those sublimation dyes that are conventionally used for heat transfer printing sheets can be used in the present invention. Examples of such sublimation dyes include dyes having sublimation characteristics, belonging to direct, acid, metal complex, basic, cationic, vat, reactive, disperse or oxidation dyes. Preferable examples of sublimation dyes useful in the present invention include anthraquinone dyes, nahutokinone dyes, a styryl dyes, indoaniline dyes, azo dyes, quinophthaon dyes and nitro dyes, methine dyes. Specifically, examples of yellow dyes include Foron Brilliant Yellow S-6GL, PTY-52 and Macrolex Yellow 6G; examples of red dyes include MS Red, Macrolex Red Violet R, Ceres Red 7B, Samaron Red HBSL and SK Rubin SEGL; and examples of blue dyes include Kayaset Blue 714, Waxoline Blue AP-FW, Foron Brilliant Blue S-R, MS Blue 100 and Daito Blue No.1.

In the present invention, an ink composition of a desired color such as black, prepared by the combination use of the above-described sublimation dyes of various colors may also be used.

c) Binder Resin

In the present invention, a binder resin is used to support the sublimation dye, and those binder resins conventionally used can be employed. Specific examples of binder resins that can be favorably used herein include cellulose resins such as ethyl cellulose, hydroxyethyl cellulose, ethylhydroxy cellulose, hydroxypropyl cellulose, methyl cellulose, cellulose acetate and cellulose butyrate; vinyl resins such as polyvinyl alcohol, polyvinyl acetate, polyvinyl butyral, polyvinyl acetal, polyvinyl pyrrolidone and polyacrylamide; and polyesters.

d) Fine Powder, Wax

Preferably, the ink composition of the present invention further comprises an organic or inorganic fine powder. A heat transfer printing sheet comprising a dye layer formed by the use of the ink composition containing a fine powder is advantageous in that the undesirable transfer of the dye contained in the dye layer to the back surface of the heat transfer printing sheet in the wound-up state is effectively prevented even when the heat transfer printing sheet is stored for a long period of time.

It is preferable that the fine powder be added to the ink composition in an amount of approximately 1 to 7% by weight, of the total amount of the binder resin. As long as the fine powder content is in the above-described range, a heat transfer printing sheet comprising a dye layer formed by the use of such an ink composition is free from the above-described transfer of the dye contained in the dye layer to the back surface of the heat transfer printing sheet. In addition, the dye layer is to have a smooth surface, so that the uneven transfer of the dye can effectively be prevented while heat transfer printing is conducted. Moreover, at the time of the formation of the dye layer, the ink composition shows improved film-forming properties such as the ability of uniformly forming films.

Specific examples of organic fine powers that can be favorably used herein include polyolefin resins such as polyethylene and polypropylene, fluororesins, polyamide resins such as nylon resins, urethane resins, styrene-acrylic crosslinked resins, phenol resins, urea resins, melamine resins, polyimide resins and benzoguanamine resins. Of these, polyethylene fine powder is more preferred. Specific examples of inorganic fine powders useful in the present invention include fine powders of calcium carbonate, silica, clay, talc, titanium oxide, magnesium hydroxide and zinc oxide.

The ink composition of the present invention may further comprise a wax. Specific examples of waxes useful herein include waxes such as microcrystalline wax, carnauba wax, paraffin wax, Fischer-Tropsh wax, various low-molecular-weight polyethylenes, Japan wax, beeswax, whale wax, insect wax, wool wax, shellac wax, candelilla wax, petrolactum, partially-modified waxes, fatty esters, fatty amides and silicone wax, as well as silicone resins, fluororesins, acrylic resins, cellulose resins, vinyl chloride-vinyl acetate copolymers, and pyroxylin. The amount of the wax to be added to the ink composition is from 0.1 to 10% by weight, preferably from 1 to 3% by weight of the solid matter of the ink composition.

e) Solvent, Production of Ink Composition

An ink composition according to the present invention is produced by introducing the above-described sublimation dye, binder resin, phosphoric ester and other components into a mixer or dispersion mixer together with a solvent to dissolve or disperse the ingredients in the solvent. Specific examples of solvents useful herein include alcoholic solvents such as methanol, ethanol, isopropyl alcohol, butanol and isobutanol, ketone solvents such as methyl ethyl ketone, methyl isobutyl ketone and cyclohexanone, aromatic solvents such as toluene and xylene, and water.

2. Heat Transfer Printing Sheet

A heat transfer printing sheet according to the present invention comprises a substrate sheet, and at least one dye layer formed on the substrate sheet by using an ink composition of the present invention. The heat transfer printing sheet of the invention may further comprise any proper combination of a transferable protective laminate, a releasing layer, an adhesive agent layer, a backing layer, other dye layers, a hot-melt transfer layer, etc. By referring to the accompanying drawings, the heat transfer printing sheet of the present invention will be described hereinafter.

Figure 2:
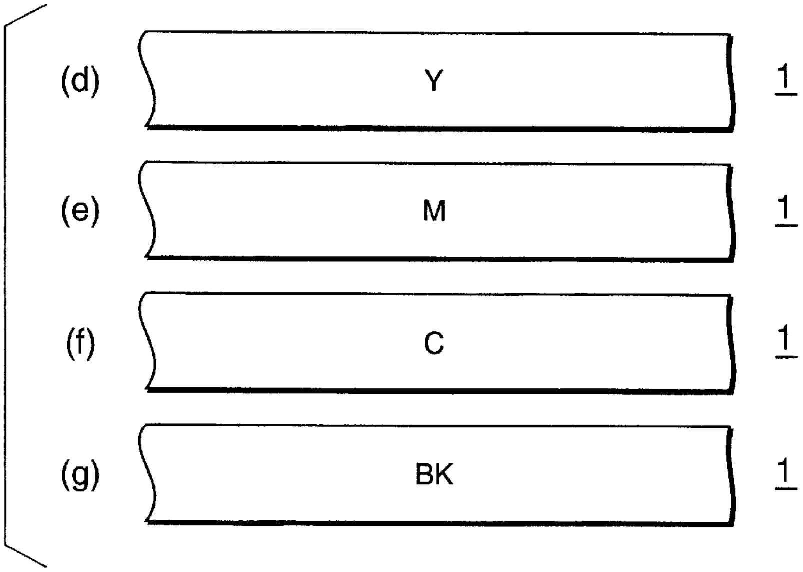
FIG. 2 is a plane view showing one embodiment of the heat transfer printing sheet according to the present invention.

FIG. 1 is a plane view showing one embodiment of the heat transfer printing sheet according to the present invention. As shown in FIGS. 1(*a*), 1(*b*) and 1(*c*), a dye layer 3 consisting of a plurality of dye layers of different colors is formed on a substrate sheet 1. In the heat transfer printing sheet shown in FIG. 1(*a*), dye layers of yellow (Y), magenta (M and cyan (C) are successively formed on a substrate sheet 1. In the heat transfer printing sheet shown in FIG. 1(*b*), dye layers of yellow (Y), magenta (M), cyan (C) and black (Bk) are successively formed on a substrate sheet 1. In the heat transfer printing sheet shown in FIG. 1(*c*), dye layers of yellow (Y), magenta (M), cyan (C) and black (Bk) are successively formed on a substrate sheet 1, and, a transferable protective laminate 4 is further provided on the substrate sheet 1 at the both ends of a set of the four dye layers (dye layer 3). The black dye layers (Bk) in FIG. 1(*b*) and FIG. 1(*c*) may be black hot-melt transfer layers (Bk), if necessary. As shown in FIGS. 1(*a*) to 1(*c*), the dye layer 3 consisting of a plurality of dye layers of different colors can be formed on the entire surface of one substrate sheet. Alternatively, the dye layer 3 consisting of a plurality of dye layers of different colors may be such that yellow dye layer Y, magenta dye layer M, cyan dye layer C and black dye layer Bk are separately formed on the entire surfaces of different substrate sheets as shown in FIGS. 2(*d*) to 2(*g*). In the latter case where a plurality of heat transfer printing sheets having dye layers of different colors are present, a fall-color image can be produced by using printing/heating means whose number is equal to the number of the heat transfer printing sheets. According to another embodiment of the present invention, the dye layer 3 consisting of a plurality of dye layers of different colors may contain hot-melt transfer layers of colors other than black, or contain dye layers of colors other than yellow, magenta, cyan and black.

Figure 3:
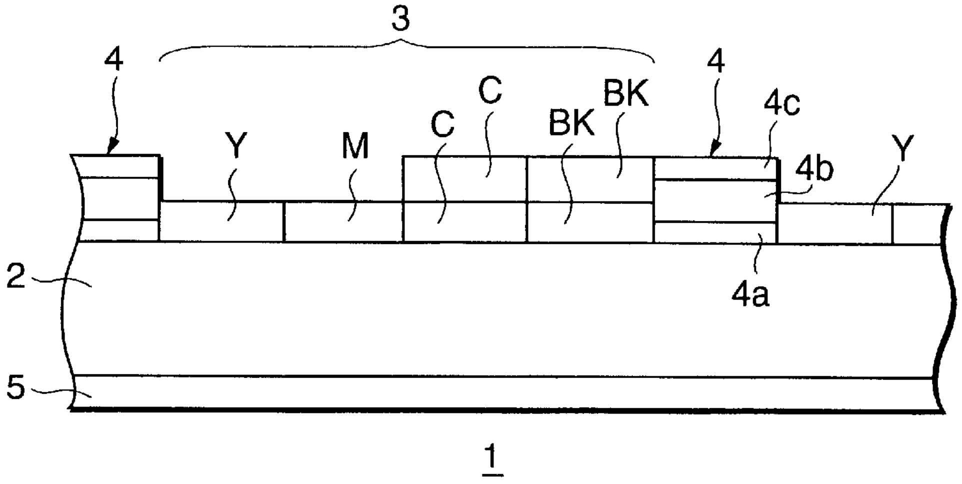
FIG. 3 is a diagrammatical sectional view showing the constitution of one embodiment of the heat transfer printing sheet according to the present invention.

FIG. 3 is a cross-sectional view showing one embodiment of the heat transfer printing sheet according to the present invention. The heat transfer printing sheet 1 shown in this figure contains a substrate sheet 2 whose outermost surface is provided with a backing layer 5. The other surface of the substrate sheet 2 is provided with a dye layer 3 consisting of a plurality of dye layers of different colors formed by using ink compositions of the invention. In this dye layer 3, yellow dye layer Y and magenta dye layer M are formed in single layers, and cyan dye layer C and black dye layer Bk are formed in double layers. In addition, a transferable protective laminate 4 is formed on the substrate sheet 2 at the both ends of the dye layer 3 consisting of the Y, M, C and Bk layers. This transferable protective laminate 4 is composed of a releasing layer 4*a,* a protective layer 4*b* and an adhesive agent layer 4*c,* and these three layers are formed on the substrate sheet 2 in the order mentioned.

Figure 4:
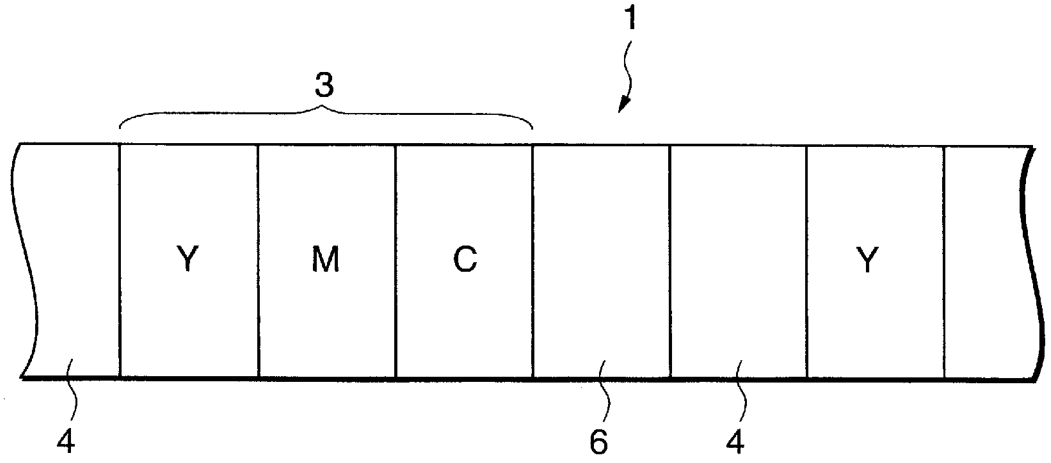
FIG. 4 is a plane view showing one embodiment of the heat transfer printing sheet according to the present invention.

FIG. 4 is a plane view showing one embodiment of the heat transfer printing sheet according to the present invention. The heat transfer printing sheet 4 shown in this figure has a dye layer 3 consisting of a plurality of dye layers of different colors formed on a substrate sheet (not shown in the figure) by using ink compositions of the invention. These dye layers of different colors, constituting the dye layer 3 are yellow dye layer Y, magenta dye layer M and cyan dye layer C, and all of the three dye layers are formed in single layers. A hot-melt transfer layer 6 is formed on the substrate sheet next to the cyan dye layer C, and a transferable protective laminate 4 is formed on the substrate sheet at the both ends of a set of the dye layer 3 and the hot-melt transfer layer 6.

a) Substrate Sheet

Any material can be used herein as the substrate sheet as long as it has some heat resistance and strength. Specific examples of substrate sheets that can be favorably used in the present invention include thin papers such as glassine paper, condenser paper and paraffin paper; oriented or non-oriented films of polyesters having high heat resistance such as polyethylene terephthalate, polyethylene naphthalate, polybutylene terephthalate, polyphenylene sulfide, polyether ketone and polyether sulfone, and of plastics such as polypropylene, polycarbonate, cellulose acetate, polyethylene derivatives, polyvinyl chloride, polyvinylidene chloride, polystyrene, polyamide, polyimide, polymethylpentene and ionomers; and laminates of two or more of the above-enumerated materials. The thickness of the substrate sheet may be properly established so that the substrate sheet can show the desired strength and heat resistance; and it is preferably about 1 to 100 $\mu$m.

b) Dye Layer

In addition to at least one dye layer formed by using an ink composition of the present invention, the heat transfer printing sheet of the invention may further comprise other dye layers formed by the use of materials other than ink compositions of the invention.

The heat transfer printing sheet of the invention may comprise one, or two or more dye layers, and each dye layer may be either a single layer or a multiple layer. Moreover, the heat transfer printing sheet of the invention may comprise both single-layered dye layers and multi-layered dye layers. In the case of a single-layered dye layer, its thickness in the dry state is approximately 0.2 to 5 $g/m^2$, preferably about 0.4 to 2 $g/m^2$. In the case of a multi-layered dye layer, the total thickness thereof is approximately 0.2 to 5 $g/m^2$, preferably about 0.4 to 2 $g/m^2$, and the thickness of each constituent layer of the dye layer is about 0.2 to 2 $g/m^2$. Further, the content of the sublimation dye in the whole multi-layered dye layer is about 5 to 90% by weight, preferably about 10 to 70% by weight.

As long as the heat transfer printing sheet comprises at least one dye layer formed by the use of an ink composition of the invention that contains the phosphoric ester, it is easily separable from an image-receiving sheet after an image is thermally transferred to the image-receiving sheet. Specifically, in each one of the heat transfer printing sheets 1 shown in FIGS. 1(*a*), 1(*b*) and 1(*c*), it is enough that at least one dye layer of any color be formed by the use of an ink composition of the present invention. Further, in the heat transfer printing sheets 1 shown in FIGS. 2(*d*) to 2(*g*), it is enough that a dye layer on at least one of the four heat transfer printing sheets be formed by the use of an ink composition of the invention.

Furthermore, since the thermal transfer of dyes is generally conducted in the order of yellow, magenta and cyan, it is enough that, in the heat transfer printing sheet 1 shown in FIG. 1(*a*), only the cyan dye layer C, which is transferred at last, be formed by using an ink composition of the invention. According to a preferred embodiment of the present invention, however, not only the cyan dye layer C but also the yellow dye layer Y and the magenta dye layer M in the heat transfer printing sheet 1 shown in FIG. 1(*a*) are formed by using ink compositions of the present invention. The reason for this is as follows: when all of the dye layers are formed by using ink compositions of the invention, the amount of the phosphoric ester can be controlled more easily than in the case where only the cyan dye layer C is formed by using an ink composition of the invention, so that the undesirable transfer of the phosphoric ester to the back surface of the heat transfer printing sheet 1 in the wound-up state can be effectively prevented.

In addition, in the case where the dye layer is a multi-layered one, it is enough that only the lowermost dye layer (on the substrate sheet side) be formed by using an ink composition of the present invention, and it is not necessary to form the uppermost dye layer by the use of an ink composition of the invention. This is because the phosphoric ester contained in the lowermost dye layer is considered to bleed to the outermost surface of the multi-layered dye layer.

The dye layer is formed on the substrate sheet by applying an ink composition of the present invention to the substrate sheet by such a method as a gravure printing, screen printing or gravure reverse roll coating method, followed by drying.

c) Transferable Protective Laminate

In the present invention, the transferable protective laminate serves to cover and protect an image produced on an image-receiving sheet by heat transfer printing. The transferable protective laminate can impart improved durability including light resistance and weathering resistance to an image thermally transferred to an image-receiving sheet. The transferable protective laminate is composed of a releasing layer, a protective layer and an adhesive agent layer. Although the order of lamination of these three layers can be freely decided, it is preferable to laminate a releasing layer, a protective layer and an adhesive agent layer in the order mentioned to form the transferable protective laminate. In the present invention, if the protective layer also has the functions of a releasing layer and an adhesive agent layer, these two layers may be omitted, as needed.

Releasing Layer

The releasing layer is provided between the substrate sheet and the protective layer. This layer may be formed by the use of a material selected from those materials having excellent release properties, for example, waxes, silicone wax, silicone resins and fluororesins, those resins having relatively high softening points that are not melted by heat applied by a thermal head, for example, cellulose resins, acrylic resins, polyurethane resins and polyvinyl acetal resins, and those resins obtained by incorporating thermo-releasing agents such as waxes into the above-described resins. The releasing layer may be formed by the same method as the previously mentioned method for forming the dye layer. The thickness of the releasing layer may be freely established; in general, however, it is approximately 0.5 to 5 $\mu$m. If it is desired that the heat-transfer-printed image be mat, it is preferable to incorporate various fine particles into the releasing layer, or to mat the protective layer side surface of the releasing layer.

Protective Layer

The protective layer can be formed by the use of a resin suitable for forming a protective layer. Specific examples of such resins include polyester resins, polystyrene resins, acrylic resins, polyurethane resins, acrylurethane resins, silicone-modified polyester, polystyrene, acrylic, polyurethane and acrylurethane resins, mixtures of these resins, ionization-radiation-curing resins, and ultraviolet-shielding resins. If necessary, ultraviolet absorbers, and organic and/or inorganic fillers may be incorporated into the protective layer.

A protective layer formed by using an ionization-radiation-curing resin is particularly excellent in plasticizer resistance and scratch resistance. Specific examples of ionization-radiation-curing resins useful herein include those resins produced by crosslinking/curing radically polymerizable polymers or oligomers by the application of ionization radiation, adding photopolymerization initiators, as needed, and then conducting polymerization/crosslinking by using electron beams or ultraviolet light.

A protective layer formed by the use of an ultraviolet-shielding resin, or a protective layer containing an ultraviolet absorber can chiefly impart light resistance to the printed image. Examples of ultraviolet-shielding resins include those resins obtained by allowing reactive ultraviolet absorbers and thermoplastic resins or the above-described ionization-radiation-curing resins to react with each other to combine the two components. More specifically, examples of ultraviolet-shielding resins are those ones obtained by introducing reactive groups such as addition-polymerizable double bond groups (e.g., vinyl group, acryloyl group, and methacryloyl group), alcoholic hydroxyl group, amino group, carboxyl group, epoxy group or isocyanate group to non-reactive organic ultraviolet absorbers of salicylate, phenyl acrylate, benzophenone, benzotriazole, coumarin, triazine, or nickel chelate type.

Non-limitative specific examples of organic and/or inorganic fillers useful herein include polyethylene wax, bisamide, nylon, acrylic resins, crosslinked polystyrene, silicone resins, silicone rubber, talc, calcium carbonate, titanium oxide, and silica fine powders such as microsilica and colloidal silica. It is preferable to use organic and/or inorganic fillers having particle diameters of 10 $\mu$m or less, preferably from 0.1to 3 $\mu$m, excellent in slip properties. Preferably, the organic and/or inorganic filler is added in such an amount that the resulting heat-transfer-printed image can have transparency. Specifically, the amount of the organic and/or inorganic filler to be added is from 0 to 100 parts by weight for 100 parts by weight of the above-described resin component.

The protective layer may be formed by the same method as the previously mentioned method for forming the dye layer. The thickness of the protective layer varies depending on the type of the resin to be used for forming the protective layer, and it is generally about 0.5 to 10 $\mu$m.

Adhesive Agent Layer

It is preferable that the adhesive agent layer be formed on top of the protective layer, in particular, as the outermost layer of the transferable protective laminate. The adhesive agent layer can improve the transferability of the protective layer. It is preferable to form the adhesive agent layer by using a resin called pressure- or heat-sensitive adhesive, specifically a thermoplastic resin having a glass transition temperature of 50 to 80° C. Specific examples of such thermoplastic resins include polyester resins, vinyl chloride-vinyl acetate copolymers, acrylic resins, ultraviolet-absorbing resins, butyral resins, epoxy resins, polyamide resins and vinyl chloride resins.

It is particularly preferred that the adhesive agent layer contain at least one of polyester resins, vinyl chloride-vinyl acetate copolymers, acrylic resins, ultraviolet-absorbing resins, butyral resins and epoxy resins. To improve adhesive properties, or to print an image not on the entire surface of an image-receiving sheet but only on a part thereof by using a heating means such as a thermal head, it is preferable that the molecular weight of the resin to be used to form the adhesive agent layer be low.

Examples of ultraviolet-absorbing resins useful herein include those resins that are obtained by reacting reactive ultraviolet absorbers with thermoplastic or ionization-radiation-curing resins to bind the two components. Specific examples of ultraviolet-absorbing resins include those ones obtained by introducing reactive groups such as addition-polymerizable double bond groups (e.g., vinyl group, acryloyl group, and methacryloyl group), alcoholic hydroxyl group, amino group, carboxyl group, epoxy group or isocyanate group to non-reactive organic ultraviolet absorbers of salicylate, phenyl acrylate, benzophenone, benzotriazole, coumarin, triazine, or nickel chelate type.

The adhesive agent layer may be formed by the same method as the previously mentioned method for forming the dye layer. The thickness of the adhesive agent layer varies depending on the type of the resin to be used for forming the adhesive agent layer, and it is generally about 0.5 to 10 $\mu$m.

d) Backing Layer

It is preferred that the heat transfer printing sheet according to the present invention be provided with a backing layer on the back surface of the substrate sheet. The backing layer can prevent thermal fusion between a heating device such as a thermal head and the substrate sheet, thereby ensuring the smooth run of the heat transfer printing sheet. Specific examples of resins useful for forming the backing layer include cellulose resins such as ethyl cellulose, hydroxy cellulose, hydroxypropyl cellulose, methyl cellulose, cellulose acetate, cellulose butyrate and nitrocellulose; vinyl resins such as polyvinyl alcohol, polyvinyl acetate, polyvinyl butyral, polyvinyl acetal and polyvinyl pyrrolidone; acrylic resins such as polymethyl methacrylate, polyethyl acrylate, polyacrylamide and acrylonitrile-styrene copolymers; polyamide resins; polyvinyl toluene resins; coumarone-indene resins; polyester resins; polyurethane resins; and silicone- or fluorine-modified urethanes. The above-enumerated natural or synthetic resins may be used either singly or as a mixture of two or more members to form the backing layer. According to a preferred embodiment of the present invention, a crosslinking agent such as polyisocyanate is added to a resin having hydroxyl functional groups selected from the above-enumerated resins to obtain as the backing layer a crosslinked resin layer, which shows more improved heat resistance.

According to another preferred embodiment of the present invention, a solid or liquid releasing or slip agent is incorporated into the backing layer to impart thereto heat-resistant slip characteristics so that the heat transfer printing sheet can slide more smoothly on a thermal head. Specific examples of releasing or slip agents useful herein include a variety of waxes such as polyethylene wax and paraffin wax, higher fatty acid alcohols, organopolysiloxane, anionic surface active agents, cationic surface active agents, amphoteric surface active agents, nonionic surface active agents, fluorine-containing surface active agents, organic carboxylic acids and derivatives thereof, fluororesins, silicone resins, and fine particles of inorganic compounds such as talc and silica. The amount of the slip agent to be incorporated into the backing layer is approximately 5 to 50% by weight, preferably about 10 to 30% of the total weight of the backing layer.

The backing layer may be formed by a conventional coating method. The thickness of the backing layer is about 0.1 to 10 $\mu$m, preferably about 0.5 to 5 $\mu$m.

e) Hot-Melt Transfer Layer

In addition to at least one dye layer formed by using an ink composition of the invention, the heat transfer printing sheet according to the present invention may further comprise a hot-melt transfer layer. An ink composition comprising a coloring agent and a binder, and, if necessary, a variety of additives is used to form the hot-melt transfer layer. Preferred for the coloring agent are organic or inorganic pigments or dyes having excellent properties as recording materials, for example, those ones that have sufficiently high coloring power and that do not undergo discoloration or fading due to light, heat, temperature or the like. Moreover, there may also be used those coloring agents that are colorless when no heat is applied but develop color when heat is applied, or that develop color when brought into contact with materials with which image-receiving sheets are coated. It is also possible to use coloring agents of colors other than cyan, magenta, yellow and black.

Specific examples of binders useful herein include resins and waxes, and mixtures thereof. Specific examples of waxes include microcrystalline wax, carnauba wax, paraffin wax, Fischer-Tropsh wax, various low-molecular-weight polyethylenes, Japan wax, beeswax, whale wax, insect wax, wool wax, shellac wax, candelilla wax, petrolactum, partially-modified waxes, fatty esters and fatty amides. Specific examples of resins include acrylic resins, vinyl chloride resins, and vinyl chloride-vinyl acetate copolymers. If a heat-conductive material is added to the hot-melt-transfer-layer-forming ink composition, the resulting hot-melt transfer layer shows high thermal conductivity and excellent hot-melt transferability. Specific examples of heat-conductive materials useful herein include carbonaceous substances such as carbon black, aluminum, copper, tin oxide and molybdenum dioxide.

According to a preferred embodiment of the present invention, a releasing layer and/or a matting layer is formed between the substrate sheet and the hot-melt transfer layer. The releasing layer can promote the release of the ink layer upon printing, and also serve as a protective layer for the printed image. The releasing layer may be formed by the use of a wax or the like whose melting point is lower or slightly lower than that of the binder contained in the hot-melt-transfer-layer-forming composition. Specifically, such a wax can easily be selected from the previously mentioned materials useful for forming the releasing layer that is a constituent layer of the transferable protective laminate. The thickness of the releasing layer is approximately 0.1 to 3.0 $\mu$m.

The matting layer is to make the image printed on an image-receiving sheet mat. Specific examples of materials useful for forming the matting layer include inorganic pigments such as silica and calcium carbonate. To form the matting layer, a matting-layer-forming composition prepared by dispersing the above-described matting agent in a resin solution is applied by a gravure printing method, or the like. The thickness of the matting layer may be approximately 0.05 to 1.0 $\mu$m.

According to another preferred embodiment of the present invention, an adhesive layer may be formed on the surface of the hot-melt transfer layer. The adhesive layer can improve the adhesion of the hot-melt transfer layer to an image-receiving sheet, thereby enhancing the transferability of the hot-melt transfer layer. Examples of materials useful for forming this adhesive layer include thermoplastic resins having relatively low melting points, for example, hot-melt adhesives such as ethylene-vinyl acetate copolymers.

To form the hot-melt transfer layer, the hot-melt-transfer-layer-forming ink composition is applied to the surface of the substrate sheet (or the surface of the releasing layer and/or the matting layer) by a hot-melt coating, hot-lacquer coating, gravure coating, gravure reverse coating or roll coating method, or any other proper means. The thickness of the hot-melt transfer layer may properly be established so that the required color density and heat sensitivity can be balanced; and it is generally about 0.1 to 30 $\mu$m, preferably about 1 to 20 $\mu$m.

3. Uses of Heat Transfer Printing Sheet

The heat transfer printing sheet according to the present invention is used in heat transfer printing methods. Specifically, the heat transfer printing sheet of the invention can be used with full-color hard copying systems for printing computer graphics images, still pictures transmitted via satellite communication, digital images of CD-ROM etc., and analog images such as video-taped images. It can also be used to print output plans or designs drawn by CAD/CAM or the like, to print images output from various analytical or measuring instruments for medical use such as CT scanners or endoscopic cameras, to obtain galley proofs, to print facial photos and characters on ID cards, credit cards, etc., to replace instant photos, and to print synthetic photos, memorial photos, etc. taken at amusement facilities such as recreation parks, game centers, museums and aquariums.

EXAMPLES

The present invention will now be explained more specifically by referring to the following Examples. However, these examples are not intended to limit the scope of the present invention in any way. In the examples, "part(s)" and "%" are based on weight, unless otherwise specified.

Preparation of Ink Composition for Forming Dye Layer

A dye-layer-forming ink composition was prepared by mixing the following dye ink and phosphoric ester.

Dye Ink 1

Dye ink 1 was prepared in accordance with the following Formulation 1.

Formulation 1

Indoaniline dye A represented by the following structural formula (IV):

| | |
|---|---|
| 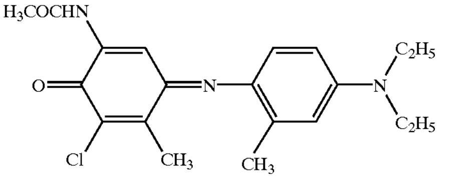 | (IV) |
| Anthraquinone dye represented by the following structural formula (V): | 1.8 parts |
| 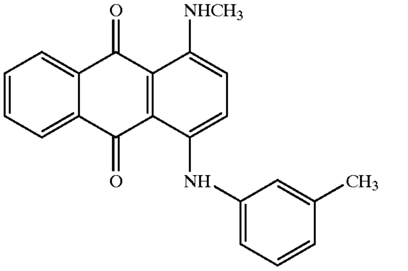 | (V) |
| Methine dye A represented by the following structural formula (VI): | 1.8 parts |
| 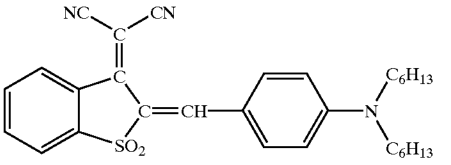 | (VI) |
| Acetoacetal resin ("KS-5" manufactured by Sekisui Chemical Co., Ltd., Japan) | 3.5 parts |
| Polyethylene powder ("MF8F" manufactured by ASTOR WAX CO.) | 0.5 parts |
| Methyl ethyl ketone | 12 parts |
| Toluene | 12 parts |

Dye Ink 2

Dye ink 2 was prepared in accordance with the above Formulation 1, provided that, instead of using the three dyes of indoaniline dye A, the anthraquinone dye and methine dye A in a total amount of 4.5 parts, one of indoaniline dyes A, B and C, methine dyes A, B and C, and the anthraquinone dye was singly used in an amount of 4.5 parts.

Indoaniline dye A had the above-described structural formula (IV). Indoaniline dye B had the following structural formula (VII):

(VII)

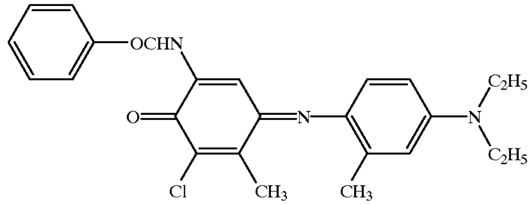

Indoaniline dye C had the following structural formula (VIII):

(VIII)

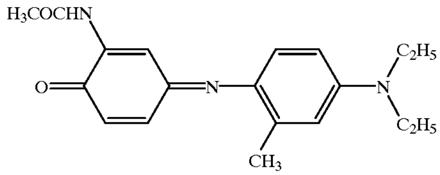

Methine dye A had the above-described structural formula (VI). Methine dye B had the following structural formula (IX):

(IX)

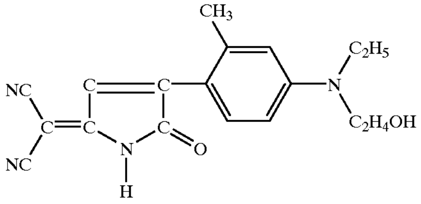

Methine dye C had the following structural formula (X):

(X)

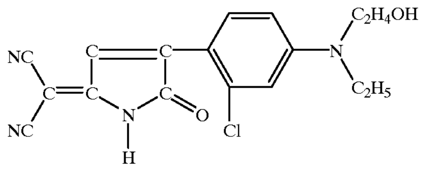

Phosphoric Ester

A dye-layer-forming ink composition was obtained by adding 20 g of a phosphoric ester, the ratio of an acid-type phosphoric ester to a neutralized-type phosphoric ester being shown in Tables 1–3, to 100 parts of the above-prepared dye ink 1 or 2. These ink compositions are as shown in Tables 1–3.

In Tables 1–3, "Acid-type" means an acid-type phosphoric ester, and "Plysurf A-208S" manufactured by Dai-ichi Kogyo Seiyaku Co., Ltd., Japan was used as this phosphoric ester; "Neutralized-type A" means neutralized-type phosphoric ester A, and "Plysurf M-208F" manufactured by Dai-ichi Kogyo Seiyaku Co., Ltd., Japan was used as this phosphoric ester; and "Neutralized-type B" means neutralized-type phosphoric ester B, and "Plysurf M-208BM" manufactured by Dai-ichi Kogyo Seiyaku Co., Ltd., Japan was used as this phosphoric ester.

Evaluation Test A

The above-prepared ink compositions were stored in the dark at room temperature for one month. They were then respectively diluted with a 1:1 (weight ratio) solvent mixture of toluene and methyl ethyl ketone to 1/3600 to obtain test solutions. The absorbance of each test solution was measured by a spectrophotometer (model "UV3100PC" manufactured by Shimadzu Corp., Japan), and the percentage of decomposition of the dye(s) was calculated by using the following equation:

Percentage of decomposition of the dye(s) (%)={(1−the maximum absorbance of the test solution)/(the maximum absorbance of the control)}×100 wherein the control is a 1:1 (weight ratio) solvent mixture of toluene and methyl ethyl ketone in an amount equal to the amount of the test solution.

Evaluation Standards

In Tables 1 and 2, which show the results regarding the ink compositions containing dye ink 1, "O" means that the percentage of decomposition of the dyes is 15% or less, and "X" means that the percentage of decomposition of the dyes is more than 15%. The numerical values in Table 3, which show the results regarding the ink compositions containing dye ink 2, are percentages of decomposition of the dye.

TABLE 1

| | Ratio of Acid-type to Neutralized-type B | Percentage of Decomposition | Evaluation |
|---|---|---|---|
| Example 1 | 10:0 | 33.39% | X |
| Example 2 | 80:20 | 13.14% | ○ |
| Example 3 | 70:30 | 5.93% | ○ |
| Example 4 | 60:40 | 4.96% | ○ |
| Example 5 | 50:50 | 11.16% | ○ |
| Example 6 | 40:60 | 22.27% | X |
| Example 7 | 30:70 | 28.93% | X |
| Example 8 | 20:80 | 29.26% | X |
| Example 9 | 0:10 | 33.11% | X |

TABLE 2

| | Ratio of Acid-type to Neutralized-type B | Percentage of Decomposition | Evaluation |
|---|---|---|---|
| Example 1 | 10:0 | 33.39% | X |
| Example 2 | 80:20 | 13.14% | ○ |
| Example 3 | 70:30 | 5.93% | ○ |
| Example 4 | 60:40 | 4.96% | ○ |
| Example 5 | 50:50 | 11.16% | ○ |
| Example 6 | 40:60 | 22.27% | X |
| Example 7 | 30:70 | 28.93% | X |
| Example 8 | 20:80 | 29.26% | X |
| Example 9 | 0:10 | 33.11% | X |

TABLE 3

| Dye | I | II | III | IV | V |
|---|---|---|---|---|---|
| Indoaniline A | 68.53 | 0.19 | 1.07 | 0.95 | 1.44 |
| Indoaniline B | 82.32 | 0 | 0 | 1.50 | 2.00 |
| Indoaniline C | 61.53 | 1.67 | 1.61 | 0.85 | 1.35 |
| Methine A | 0 | 100 | 100 | 22.33 | 38.97 |
| Methine B | 0 | 91.43 | 87.42 | 12.34 | 18.85 |
| Methine C | 0 | 100 | 100 | 9.98 | 15.58 |
| Anthraquinone | 3.28 | 2.18 | 2.32 | 2.15 | 2.10 |

In the table,

"I" is "Mixed with Acid-type";

"II" is "Mixed with Neutralized-type A";

"III" is "Mixed with Neutralized-type B";

"IV" is "Mixed with a 1:1 Mixture of Acid-type and Neutralized-type A"; and

"V" is "Mixed with a 1:1 Mixture of Acid-type and Neutralized-type B".

The results of Evaluation Test A demonstrate that the indoaniline dyes and the methine dyes are considerably decomposed by the acid-type phosphoric ester and the neutralized-type phosphoric ester, respectively. The indoaniline dyes and the anthraquinone dye were not so decomposed by the 1:1 (weight ratio) mixture of the acid-type phosphoric ester and the neutralized-type phosphoric ester. On the other hand, in the case of the methine dyes, the percentages of decomposition caused by the 1:1 (weight ratio) mixture of the acid-type phosphoric ester and the neutralized-type phosphoric ester were intermediate between those of decomposition caused by the acid-type phosphoric ester and those of decomposition caused by the neutralized-type phosphoric ester although they varied depending upon the structure of the dye. It is therefore believed that when a mixture of an acid-type phosphoric ester and a neutralized-type phosphoric ester in a proper ratio is added to dye ink containing a methine dye, the dye scarcely undergoes decomposition.

Production of Heat Transfer Printing Sheet

A. Examples 10 to 13 & Comparative Examples 1 and 2 a) Formation of Backing Layer on Substrate Sheet

A polyethylene terephthalate film having a thickness of 6 μm (trade name "Lumirror", manufactured by Toray Industries, Inc., Japan) was prepared as the substrate sheet. A backing-layer-forming composition prepared in accordance with the following Formulation 2 was applied to one surface of the above film by a gravure coating method in an amount of 1.0 $g/m^2$ on a dry basis, and then subjected to aging at 60° C. for curing, thereby forming a backing layer on the substrate sheet.

| Formulation 2 | |
|---|---|
| Polyvinyl butyral resin ("Nislec BX-1" manufactured by Sekisui Chemical Co., Ltd., Japan) | 3.6 parts |
| Polyisocyanate ("Vernock D750" manufactured by Dainippon Ink & Chemical, Inc., Japan) | 8.4 parts |
| Phosphoric ester ("Plysurf A-208S" manufactured by Dai-ichi Kogyo Seiyaku Co., Ltd., Japan) | 2.8 parts |
| Talc ("Micorniece P-3" manufactured by Nippon Talc Co., Ltd., Japan) | 0.6 parts |
| Toluene/methyl ethyl ketone (weight ratio 1:1) | 190 parts |

b) Formation of Dye Layer and Hot-Melt Transfer Layer

Ink compositions prepared in the manners described below were respectively applied by a gravure coating method to the surface of the polyethylene terephthalate film, opposite to the backing layer side surface, in an amount of 1 $g/m^2$ on a dry basis, whereby yellow, magenta and cyan dye layers were successively formed on the substrate sheet in the order mentioned.

A releasing layer was formed on the dye layers by applying the releasing-layer-forming composition prepared in the below-described manner in an amount of 0.5 $g/m^2$on a dry basis. On top of this releasing layer, a hot-melt-transfer-layer-forming black ink composition prepared in the manner described below was applied in an amount of 1.0 $g/m^2$ on a dry basis to form a black hot-melt transfer layer. Thus, the dye layers and the hot-melt transfer layer were formed as a set of 4 colors of yellow, magenta, cyan and black. It is noted that this set was repeatedly formed so that the length of each set would be 10 cm.

The dye-layer-forming ink compositions, the releasing-layer-forming composition and the hot-melt-transfer-layer-forming black ink composition used in the above procedure were prepared as described below.

Yellow-Dye-Layer-Forming Ink Composition

The yellow-dye-layer-forming ink composition was prepared in accordance with the following formulation.

Quinophthalone dye represented by the following structural formula (XI):

| | |
|---|---|
| 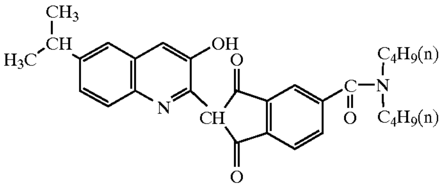 (XI) | 5.5 parts |
| Acetoacetal resin ("KS-5" manufactured by Sekisui Chemical Co., Ltd., Japan) | 3.5 parts |
| Phosphoric ester ("Plysurf A-208S" manufactured by Dai-ichi Kogyo Seiyaku Co., Ltd., Japan) | 0.1 parts |
| Polyethylene powder ("MF8F" manufactured by ASTOR WAX CO.) | 0.1 parts |
| Toluene/methyl ethyl ketone (weight ratio 1:1) | 90 parts |

Magenta-Dye-Layer-Forming Ink Composition

The magenta-dye-layer-forming ink composition was prepared in accordance with the same formulation as the above except that a magenta disperse dye (C.I. Disperse Red 60) was used in an amount of 5.5 parts instead of the quinophthalone dye.

Cyan-Dye-Layer-Forming Ink Composition 1

To a base ink composition prepared in accordance with the following formulation, the below-described phosphoric ester was added in amounts shown in Table 4 to obtain cyan-dye-layer-forming ink compositions 1 that would be used to make thermal transfer printing sheets of Examples 10 to 13, and those of Comparative Examples 1 and 2.

Base Ink Composition

| | |
|---|---|
| Indoaniline dye A represented by structural formula (IV) | 1.8 parts |
| Anthraquinone dye represented by structural formula (V) | 1.8 parts |
| Methine dye A represented by structural formula (VI) | 0.9 parts |
| Acetoacetal resin ("KS-5" manufactured by Sekisui Chemical Co., Ltd., Japan) | 3.5 parts |
| Polyethylene powder ("MF8F" manufactured by ASTOR WAX CO.) | 0.1 parts |
| Methyl ethyl ketone | 12 parts |
| Toluene | 12 parts |

Phosphoric Ester

The phosphoric ester was a 65:35 (weight ratio) mixture of an acid-type phosphoric ester and a neutralized-type phosphoric ester, and the amounts of this phosphoric ester used in Examples 5 to 8 and Comparative Examples 15 and 16 were as shown in Table 4. For the acid-type phosphoric ester, "Plysurf A-208S" manufactured by Dai-ichi Kogyo Seiyaku Co., Ltd., Japan was used; and for the neutralized-type phosphoric ester, "Plysurf M-208BM" manufactured by Dai-ichi Kogyo Seiyaku Co., Ltd., Japan was used in Example 6, and "Plysurf M-208F" manufactured by Dai-ichi Kogyo Seiyaku Co., Ltd., Japan was used in the other examples.

TABLE 4

| | |
|---|---|
| Example 10 | 0.05 parts |
| Example 11 | 0.1 parts |
| Example 12 | 0.1 parts |
| Example 13 | 0.2 parts |
| Comp. Ex. 1 | 0.003 parts |
| Comp. Ex. 2 | 1.1 parts |

Releasing-Layer-Forming Composition

The releasing-layer-forming composition was prepared in accordance with the following formulation.

| | |
|---|---|
| Acrylic resin | 20 parts |
| Methyl ethyl ketone | 100 parts |
| Toluene | 100 parts |

Hot-Melt-Transfer-Layer-Forming Black Ink Composition

The hot-melt-transfer-layer-forming black ink composition was prepared in accordance with the following formulation.

| | |
|---|---|
| Acrylic-vinyl chloride-vinyl acetate copolymer resin | 20 parts |
| Carbon black | 10 parts |
| Methyl ethyl ketone | 35 parts |
| Toluene | 35 parts |

c) Formation of Transferable Protective Laminate

In the area on the polyethylene terephthalate film where no dye layer had been formed, a transferable protective laminate was formed. Specifically, a releasing-layer-forming composition prepared in accordance with the formulation described below was applied to the above area by a gravure coating method in an amount of 1.0 g/m$^2$ on a dry basis, thereby forming a releasing layer. A protective-layer-forming composition prepared in accordance with the formation described below was applied to the releasing layer by a gravure coating method in an amount of 4 g/m$^2$ on a dry basis, thereby forming a protective layer. On top of this protective layer, an adhesive layer was formed by applying, by a gravure coating method, an adhesive-layer-forming composition prepared in accordance with the below-described formulation in an amount of 1.0 g/m$^2$on a dry basis. Thus, heat transfer printing sheets of Examples 10 to 13 and those of Comparative Examples 1 and 2 were respectively produced.

The formulation of the releasing-layer-forming composition, that of the protective-layer-forming composition and that of the adhesive-layer-forming composition are as follows.

| Releasing-Layer-Forming Composition | |
|---|---|
| Silicone-modified acrylic resin | 16 parts |
| Aluminum catalyst | 3 parts |
| Methyl ethyl ketone | 8 parts |
| Toluene | 8 parts |

-continued

| | |
|---|---|
| Protective-Layer-Forming Composition | |
| Acrylic resin | 15 parts |
| Vinyl chloride-vinyl acetate copolymer | 5 parts |
| Polyethylene wax | 0.3 parts |
| Polyester resin | 0.1 parts |
| Methyl ethyl ketone | 40 parts |
| Toluene | 40 parts |
| Adhesive-Layer-Forming Composition | |
| Vinyl chloride-vinyl acetate copolymer | 20 parts |
| Methyl ethyl ketone | 100 parts |
| Toluene | 100 parts |

B. Example 14 a) Formation of Backing Layer on Substrate Sheet

A substrate sheet was provided with a backing layer in the same manner as in Example 10.

b) Formation of Dye Layers and Hot-Melt Transfer Layer

In the same manner as in Example 10, ink compositions were respectively applied by a gravure coating method to the surface of the polyethylene terephthalate film, opposite to the backing layer side surface, in an amount of 1 $g/m^2$ on a dry basis, whereby yellow, magenta and cyan dye layers were successively formed on the substrate sheet in the order mentioned.

The above-described releasing-layer-forming composition was applied to the dye layers in an amount of 0.5 $g/m^2$ on a dry basis to form a releasing layer, and, on top of this releasing layer, a black hot-melt transfer layer was formed by applying the above-described hot-melt-transfer-layer-forming black ink composition in an amount of 1.0 $g/m^2$ on a dry basis. Thus, there was obtained a heat transfer printing sheet in which a set of the dye layers of 4 colors of yellow, magenta, cyan and black was repeatedly formed.

It is noted that the cyan dye layer was formed in a double layer by applying, by a gravure coating method, cyan-dye-layer-forming ink composition 3 in an amount of 0.7 $g/m^2$ on a dry basis to form a first cyan dye layer, and by applying, by a gravure coating method, cyan-dye-layer-forming ink composition 2 to the first cyan dye layer in an amount of 0.7 $g/m^2$ on a dry basis to form a second cyan dye layer.

The yellow-dye-layer-forming ink composition, the magenta-dye-layer-forming ink composition, and the hot-melt-transfer-layer-forming black ink composition used in this example were the same as those used in Example 10. The cyan-dye-layer-forming ink compositions 2 and 3 were respectively prepared in accordance with the following formulations.

| | |
|---|---|
| Cyan-Dye-Layer-Forming Ink Composition 2 | |
| Indoaniline dye A represented by structural formula (IV) | 1.8 parts |
| Anthraquinone dye represented by structural formula (V) | 1.8 parts |
| Methine dye A represented by structural formula (VI) | 0.9 parts |
| Acetoacetal resin ("KS-5" manufactured by Sekisui Chemical Co., Ltd., Japan) | 3.5 parts |
| Phosphoric ester ["PlysurfA-208S": "Plysurf M-208BM" (acid-type neutralized-type) = 65:35 (weight ratio), manufactured by Dai-ichi Kogyo Seiyaku Co., Ltd., Japan] | 0.1 parts |

-continued

| | |
|---|---|
| Polyethylene powder ("MF8F" manufactured by ASTOR WAX CO.) | 0.1 parts |
| Methyl ethyl ketone | 12 parts |
| Toluene | 12 parts |
| Cyan-Dye-Layer-Forming Ink Composition 3 | |
| Indoaniline dye A represented by structural formula (IV) | 1.8 parts |
| Anthraquinone dye represented by structural formula (V) | 1.8 parts |
| Methine dye A represented by structural formula (VI) | 0.9 parts |
| Acetoacetal resin ("KS-5" manufactured by Sekisui Chemical Co., Ltd., Japan) | 4.5 parts |
| Polyethylene powder ("MF8F" manufactured by ASTOR WAX CO.) | 0.1 parts |
| Methyl ethyl ketone | 12 parts |
| Toluene | 12 parts |

c) Formation of Transferable Protective Laminate

In the same manner as in Example 10, a transferable protective laminate was formed in the area (length 10 cm) on the polyethylene terephthalate film where no dye layer had been formed, provided that the amount of the releasing-layer-forming composition to be used to form the releasing layer was changed to 0.5 $g/m^2$ on a dry basis. A heat transfer printing sheet of Example 14 was thus obtained.

Evaluation Test B

The heat transfer printing sheets of Examples 10 to 14 and those of Comparative Examples 1 and 2 were subjected to the following evaluation tests. The results were as shown in Table 5.

Evaluation 1: Separability

The heat transfer printing sheet was set in a printer (model "CP-510" manufactured by VDS Corp.), and an image was thermally transferred to an ID card (manufactured by Dai Nippon Printing Co., Ltd., Japan) at a temperature of 35° C. and a humidity of 85 RH%. Specifically, the dyes of yellow, magenta and cyan were successively sublimed and transferred to the ID card in the mentioned order to obtain a full-color image. The signature was then printed by the use of the black hot-melt transfer layer. The transferable protective laminate on the heat transfer printing sheet was finally transferred to the ID card to cover the full-color image. An image-bearing ID card was thus obtained. By visually observing the state of the transfer of the dye layers and the hot-melt transfer layer from the heat transfer printing sheet to the ID card, the separability was evaluated in accordance with the following standards.

Evaluation Standards

A: Neither abnormal transfer nor thermal fusion occurred.

B: Neither abnormal transfer nor thermal fusion occurred, but the undesirable separation of the dye from the heat transfer printing sheet was observed.

C: No thermal fusion occurred, but abnormal transfer took place.

D: Thermal fusion occurred.

Evaluation 2: Adhesion

Mending tape "MDLP-12" manufactured by Nichiban Co., Ltd., Japan was adhered to the cyan dye layer in the heat transfer printing sheet, and then separated at an angle of 180°. By visual observation, the adhesion between the substrate sheet and the dye layer was evaluated in accordance with the following standards.

Evaluation Standards

O: The dye layer was not separated from the substrate sheet.

X: The dye layer was separated from the substrate sheet along with the tape.

TABLE 5

| | Evaluation 1 | Evaluation 2 | Phosphoric Ester Content (%) |
|---|---|---|---|
| Example 10 | A | O | 1.4 |
| Example 11 | A | O | 2.9 |
| Example 12 | A | O | 2.9 |
| Example 13 | A | O | 5.7 |
| Example 14 | A | O | 2.9 |
| Comp. Ex. 1 | C | X | 0.09 |
| Comp. Ex. 2 | A | X | 31 |

In the table, "Phosphoric Ester Content" means the percentage by weight of the phosphoric ester to the binder resin in the cyan-dye-layer-forming ink composition.

The results shown in the above table demonstrate that, when the dye layer in the heat transfer printing sheet contains the phosphoric ester in an amount of 0.1 to 30% by weight of the binder resin, the heat transfer sheet can easily be separated from the image-receiving sheet after an image is thermally transferred to the image-receiving sheet. Moreover, as long as the phosphoric ester content falls in the above-described range, the adhesion between the substrate sheet and the dye layer is not impaired.

What is claimed is:

1. An ink composition for forming a dye layer for a heat transfer printing sheet, comprising a sublimation dye, a binder resin, a phosphoric ester and a solvent, wherein the phosphoric ester is composed of an acid phosphoric ester and a neutralized phosphoric ester.

2. The ink composition according to claim 1, wherein the acid phosphoric ester and the neutralized phosphoric ester is in a ratio between 80:20 and 50:50.

3. The ink composition according to claim 1, wherein the amount of the phosphoric ester is in the range of 0.1 to 30% by weight of the binder resin.

4. A heat transfer printing sheet comprising a substrate sheet, and dye layers of one or more colors formed on one surface of the substrate sheet, wherein at least one of the dye layers is formed by the use of an ink composition comprising a sublimation dye, a binder resin, a phosphoric ester and a solvent, wherein the phosphoric ester is composed of an acid phosphoric ester and a neutralized phosphoric ester.

5. The heat transfer printing sheet according to claim 4, wherein the dye layer is formed in a single layer or a multiple layer.

6. The heat transfer printing sheet according to claim 4, further comprising a transferable protective laminate and/or hot-melt transfer layer.

* * * * *